Aug. 13, 1963 J. P. PUFAHL 3,100,408
PORTABLE ELECTRIC DRILL PRESS
Filed June 15, 1962 2 Sheets-Sheet 1
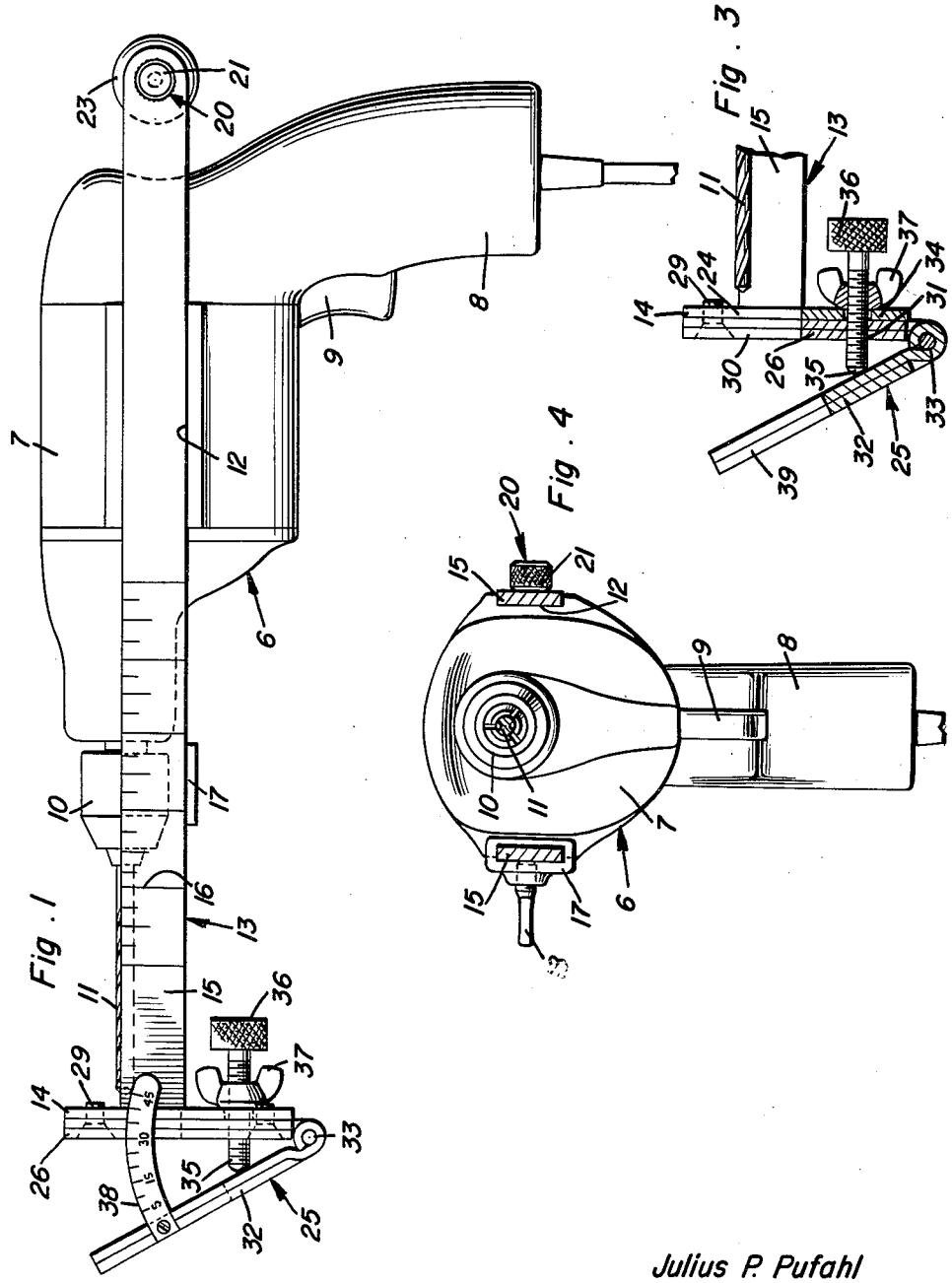
Julius P. Pufahl
INVENTOR.

Aug. 13, 1963     J. P. PUFAHL     3,100,408
PORTABLE ELECTRIC DRILL PRESS
Filed June 15, 1962     2 Sheets-Sheet 2
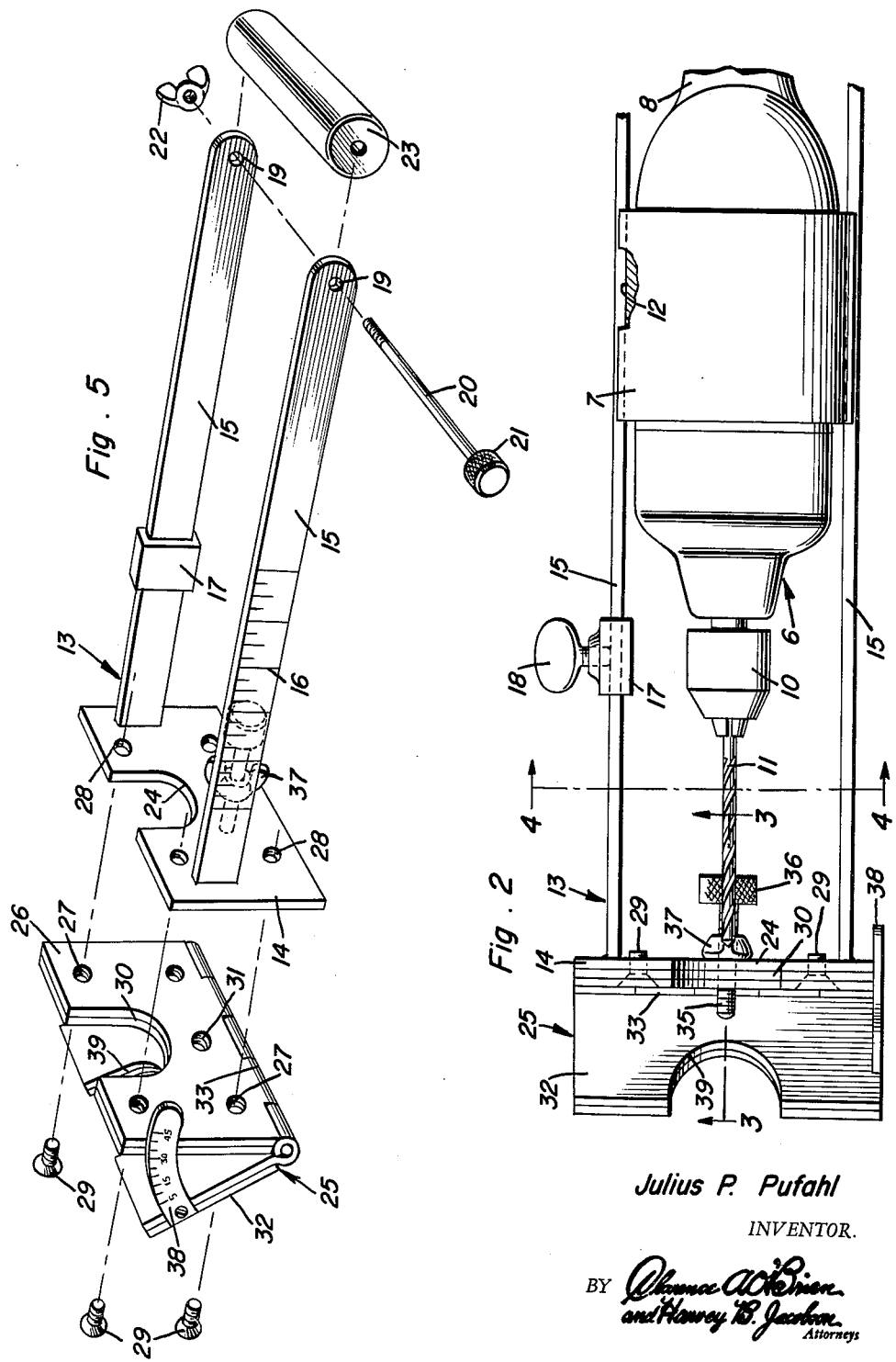
Julius P. Pufahl
INVENTOR.

United States Patent Office 3,100,408
Patented Aug. 13, 1963

3,100,408
PORTABLE ELECTRIC DRILL PRESS
Julius P. Pufahl, 654 Webster St., Ottawa, Ill.
Filed June 15, 1962, Ser. No. 202,767
9 Claims. (Cl. 77—55)

This invention relates to new and useful improvements in portable electric power drill presses and has for its primary object to provide, in a manner as hereinafter set forth, novel means for slidably supporting a tool of this character in a true perpendicular position relatively to the workpiece.

Another highly important object of the present invention is to provide a portable electric power drill press of the aforementioned character comprising means whereby the hole may be expeditiously and accurately drilled at any desired angle.

Still another important object of the present invention is to provide a portable electric power drill which embodies unique means for regulating the depth of the hole.

Another object is to provide a drill of the character set forth wherein the angle, the depth, etc., attachments may be expeditiously removed when desired to permit said drill to be used conventionally.

Other objects of the invention are to provide a portable electric power drill which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation of a portable electric power drill constructed in accordance with the present invention;

FIGURE 2 is a top plan view thereof;

FIGURE 3 is a fragmentary view in longitudinal section through the forward or lower portion of the assembly taken substantially on the line 3—3 of FIGURE 2;

FIGURE 4 is a view in transverse section, taken substantially on the line 4—4 of FIGURE 2; and FIGURE 5 is an exploded perspective view of the attachment, showing the parts removed from the drill.

Referring now to the drawing in detail, it will be seen that the embodiment of the invention which has been illustrated compdises a portable electric power drill which is designated generally by reference numeral 6. The drill 6 includes an electric motor housing 7, a grip 8, a trigger switch 9, and a chuck 10, said chuck having mounted therein a drill bit 11. The sides of the drill body or housing 7 have formed therein longitudinal guide channels or grooves 12.

The drill 6 is mounted in a removable holder 13. The holder 13 includes a generally rectangular base or face plate 14 of suitable metal and of any desired dimensions. The plate 14 is fixedly mounted on one end of a pair of spaced, parallel arms 15 in the form of flat metallic bars which are slidably engaged in the grooves or channels 12 of the drill housing 7. The arms 15 are graduated as indicated at 16 and mounted for sliding adjustment on either or both of said arms is a depth regulating collar or stop 17 which is secured in adjusted position through the medium of a setscrew 18.

The inner or rear end portions of the arms 15 are apertured at 19 to receive a connecting bolt 20 having a knurled head 21 on one end. A wing nut 22 is threaded on the other end portion of the bolt 20. Mounted on the bolt 20 is a removable handle 23 which also functions as a spacer for the arms 15. Thus, the holder 13 is firmly but removably secured on the drill 6. The plate 14 has formed in its upper potrion a generally U-shaped cutout or opening 24 which accommodates the bit 11.

Removably mounted on the plate 14 of the holder 13 is an angle gauge 25. The gauge 25 includes, in the embodiment shown, a laminated metallic base plate 26 having smooth or unthreaded openings 27 in its corner portion for alignment with threaded openings 28 in the corresponding portions of the plate 14. The registering openings 27 and 28 are for the reception of countersunk screws 29 which detachably secure the angle gauge 25 on the plate 14.

The upper portion of the base 26 of the angle gauge 25 is further provided with a generally U-shaped cutout or opening 30 which registers with the opening 24 in the plate 14. Below the opening or cutout 30, the lower portion of the base 26 has formed therein a threaded opening 31. Hingedly mounted for vertical swinging adjustment on the base 26 is a contact plate 32. A piano type hinge 33 pivotally connects the contact plate 32 to the lower portion of the base plate 26. As shown to advantage in FIGURE 3 of the drawing, the opening 31 is in registry with a relatively large, smooth or unthreaded opening 34 in the lower portion of the plate 14 below the opening or recess 24. The opening 34 accommodates an adjusting screw or bolt 35 for the contact plate 32. The adjusting screw 35 is threaded through the opening 31 in the base 26 from the rear thereof for engagement with the contact plate 32. The screw 35 includes a knurled head 36. A winged lock nut 37 secures the screw 35 in adjusted position, said lock nut being engageable with the plate 14. A protractor 38 is provided on the contact plate 32 to facilitate adjusting the angle gauge 25 to the desired position.

It is thought that the use or operation of the invention will be readily apparent from a consideration of the foregoing. Briefly, when a hole is to be drilled perpendicular to the work the angle gauge 25 may be omitted. The plate 14 is brought into face-abutting engagement with the workpiece thus positioning the arms 15 at right angles thereto. The drill 6 is then fed to the work in an obvious manner, said drill sliding on the arms 15, the tool 11 contacting the work through the opening or recess 24 in the plate 14. By adjusting the stop 17 on the respective arm 15 the forward movement of the drill may be arrested at any point for regulating the depth of the hole, as will be apparent. The scales 16 on the arms 15 facilitates adjusting the stops 17 to the desired position. When it is desired to drill the hole at some other angle, the attachment 25 is secured in position on the plate 14 of the holder 13. Through the medium of the screw 35 the contact plate 32 is adjusted to the desired angle and the work proceeds substantially as above described. It will be observed that the construction and arrangement is such that the parallel arms or bars 15 are free of the operator's hand and the work to be done is clearly visible. By simply removing the handle 23 from the arms 15 the holder 13 may be detached for permitting the electric drill 6 to be used conventionally. The construction and arrangement also is such that the holder 13 may be readily mounted on the drill and removed therefrom without the use of tools. A conventional screwdriver may be used for inserting and removing the screws 29 which secure the angle gauge 25 on the plate 14. If desired, an emery wheel or other tool may be secured in the chuck 10 of the drill 6. The upper portion of the contact plate 32 is provided with a generally U-shaped opening or recess 39 for registry with the openings 24 and 30, said opening 39 also accommodating the drill bit 11. In addition to functioning as a guide for the tool during a drilling operation, the unit or holder 13 serves as a guard for the bit 11. Like the mounting plate 26, the contact plate 32 of the angle gauge 25 is laminated. It will be apparent that by tightening the wing nut 22 on the bolt 20 the sliding action of the drill 6 between the guide bars 15 may be regulated.

The foregoing is considered as illustrative only of the principles of the invention. Further, since numerous modifications and changes will readily occur to those skilled in the art, it is not desired to limit the invention to the exact construction and operation shown and described; and accordingly all suitable modifications and equivalents may be resorted to, falling within the scope of the invention as claimed.

What is claimed as new is as follows:

1. A portable electric drill attachment comprising a guide including a pair of bars longitudinally slidably receiving the drill therebetween, a plate on the forward ends of the bars, and an angle gauge removably mounted on the guide, said angle gauge including a mounting plate detachably secured on the guide plate, a workpiece-contacting plate hingedly mounted for swinging adjustment on said mounting plate, means for adjusting the contacting plate, said means including a screw threaded through the mounting plate for abutting engagement with said contacting plate.

2. A portable electric drill attachment in accordance with claim 1, together with a stop collar mounted for longitudinal sliding adjustment on at least one of the arms for limiting forward sliding movement of the drill in the guide.

3. A portable electric drill attachment in accordance with claim 2, said one arm being graduated for facilitating adjusting the stop collar.

4. A portable electric drill attachment in accordance with claim 3, said handle including a nutted bolt extending between the bars, and a cylindrical grip removably mounted on said bolt.

5. The combination of claim 1, all of the plates having a generally U-shaped recess in an edge thereof for the passage of a tool in the drill.

6. A portable electric drill attachment in accordance with claim 1, together with a handle removably mounted between the rear end portions of the bars.

7. A portable electric drill attachment in accordance with claim 6, said handle including a nutted bolt connecting the bars, and a removable grip on the bolt between the bars.

8. A portable electric drill attachment comprising elongated guide means adapted to have an electric drill guidingly mounted thereon for movement longitudinally of said guide means and with the axis of rotation of the chuck of the drill generally paralleling said guide means, a transversely extending mounting plate secured to one end of said guide means, a workpiece-contacting plate hingedly mounted from and for swinging movement relative to said mounting plate, and adjustable means supported from one of said plates and engaged with the other plate and operative to positively adjust the position to which said workpiece-contacting plate may be swung relative to said mounting plate.

9. A portable electric drill attachment comprising elongated guide means adapted to have an electric drill guidingly mounted thereon for movement longitudinally of said guide means and with the axis of rotation of the chuck of the drill generally paralleling said guide means, a transevrsely extending mounting plate secured to one end of said guide means, a workpiece-contacting plate hingedly mounted from and for swinging movement relative to said mounting plate, and a screw threaded through one of said plates for abutting engagement with the other of said plates for positively adjusting the position to which said workpiece-contacting plate may be swung relative to said mounting plate.

References Cited in the file of this patent

UNITED STATES PATENTS

| 427,325 | Irwin et al. | May 6, 1890 |
|---|---|---|
| 1,470,143 | Buterbaugh | Oct. 9, 1923 |
| 1,603,337 | Gury | Oct. 19, 1926 |
| 2,831,376 | Daniels | Apr. 22, 1958 |

FOREIGN PATENTS

| 19,448 | Denmark | Oct. 23, 1914 |